United States Patent Office 2,910,468
Patented Oct. 27, 1959

2,910,468
SULFURIZED STEROLS

Frederick E. Dearborn, Washington, D.C.

No Drawing. Application November 10, 1955
Serial No. 546,288

10 Claims. (Cl. 260—239.5)

(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This application is a continuation-in-part of application bearing Serial No. 233,675, filed June 26, 1951, now abandoned.

This invention relates to sulfurized sterols prepared from unsaturated sterols by saturating their double bond or bonds with sulfur, and has among its objects the provision of such compounds and a process for preparing them. Other objects will be apparent from the description of the invention.

Sterols are complex cyclic alcohols of high molecular weight which, in the free state or in the form of esters of high molecular weight fatty acids, are to be found wherever the phenomena of life is seen. They play an important role in life processes about which, as yet, comparatively little is known. Those of animal origin are called zoosterols, those of vegetable origin are called the phytosterols, and those of yeasts origin are known as the mycosterols. Most, if not all, are secondary alcohols. Both saturated and unsaturated sterols occur in nature. They are obtained from oils, fats, and waxes in which they occur free or as esters, by saponification, and will be found in the unsaponifiable portion from which they may be separated by extraction with solvents.

One of the characteristics of the sterols is the softening effect they have on living skin tissue. Their effects continue even when diluted with oils which would, by themselves, cause cracking and roughness when applied to the skin. The sterols in lanolin are most nearly related to the fat secreted by the sebaceous glands of human skin than any other commercially available material, as chemical analyses show that similar sterols are found in the human skin.

The sulfurized sterols of the invention possess added beneficial properties due to the combined sulfur in the molecule, as sulfur preparations are well known for their therapeutic effects in treating certain skin disorders. Since the sterols are readily absorbed by the skin, a new and ready means of introducing sulfur into the system is available.

The sulfurized sterols, further, are highly resistant to caustic alkalies, acids, and oils. Thus, although anhydrous lanolin (composed mainly of sterol esters), used as an ingredient in protective ointments for the prevention of occupational dermatitis, ranks as one of the best general skin protectives against alkalies, acids and oils, the sulfurized sterols, however, are more resistant than lanolin to the action of alkalies, acids and oils as they are not saponifiable whereas lanolin can be saponified. They also have important advantages, as indicated in preliminary tests, of possessing non-toxic, non-caustic, analgesic, antithermic, endosmotic, keratoplastic and hemostatic properties. Other desirable characteristics possessed by the sulfurized sterols are their affinity to the sebum exuded by human skin, their emulsifying power which renders them capable of absorbing large amounts of water, their ability to convey emulsifying power to other non-emulsifying fats and oils, their freedom from rancidity, their non-support of bacterial growth, and their ready absorption by the skin.

The sulfurized sterols, furthermore, possess antiseptic, germicidal and fungicidal characteristics which render them especially valuable for use as, or in, skin compounds for the prevention of occupational dermatitis, and for the protection of the skin in other ways. Other preferred uses for the sulfurized sterols can be found in the treatment of skin disorders of aging persons. The oil and sweat glands in aging persons suffer and may disappear, or lose much of their functioning power. Furthermore, shrinkage takes place as well as a loss of elasticity and a tendency to dryness is common. Dermatitis and eczema are fairly widespread. In many cases bacterial and fungus infections are responsible. Ordinarily, recovery is retarded because senile skin heals slowly. Preliminary tests made using sulfurized sterols in this connection have given highly beneficial results.

I have found that the unsaturated sterols may be made to combine with sulfur under proper conditions, the sulfur chemically adding at the double bond or bonds. The amount of sulfur that will combine is dependent upon the degree of unsaturation of the sterol. Thus, cholesterol contains one double bond in the 5–6 position in the nucleus of its molecule, hence, it is capable of combining with one atom of sulfur, forming a compound containing 7.5% of sulfur. Lanosterol contains two double bonds in its molecule, hence, two sulfur compounds are possible, one containing 7.0% of sulfur and the other 13.1% of sulfur, depending whether one or both double bonds are saturated with sulfur. In this compound, the most active bond is found in the side chain, which adds sulfur first, followed by the less reactive bond. Sterols containing three double bonds in their molecule form three sulfur compounds depending whether one, two, or all three double bonds are saturated with sulfur. The most reactive double bond adds sulfur first, followed by the next reactive bond, with the least reactive bond adding sulfur last.

The reaction taking place when sulfur is chemically added to a double bond may be graphically represented as follows:

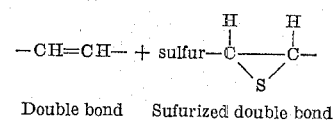

Double bond    Sufurized double bond

This sulfurized double bond in which two adjacent carbon atoms are linked to each other and to a sulfur atom may be defined as a thiirane group. The formation of such thiirane linkages is also described in my Patents Nos. 2,159,583, 2,169,793, 2,237,096, 2,333,093, and 2,427,717 and in my copending applications, Serial No. 233,677, filed June 26, 1951, now abandoned, entitled "Esters of Glycols and Sulfurized Fatty Acids," Serial No. 233,678, filed June 26, 1951, entitled "Compounds Containing Halogens Linked to Sulfur," which has matured into Patent No. 2,695,286, granted November 23, 1954, and Serial No. 233,676, filed June 26, 1951, now U.S. Patent 2,729,634, entitled "Synthetic Sterol Esters Containing Sulfur."

The following are some of the unsaturated sterols that may be used in carrying out my invention.

*Cholesterol.*—It occurs in egg yolk, brains, bile, wool fat and various other fats and is also present in fish and other liver oils. It is a monohydric alcohol containing one double bond in the 5:6 position in the nucleus of the molecule. Mild hydrogenation saturates the double bond yielding dihydrocholesterol.

*7-dehydrocholesterol.*—It is a provitamin prepared from cholesterol and on irradiation with ultra-violet light yields vitamin D$_3$. It contains two double bonds, one in the 5:6 position and one in the 7:8 position, the latter double bond being the more reactive.

*Lanosterol.*—It occurs in considerable quantities in wool fat. It contains two double bonds which are in the 8:9 and 24:25 positions in the molecule, the latter double bond being the most reactive.

*Dihydrolanosterol.*—It contains one double bond in the 8:9 position. It is prepared by saturating the double bond in the side chain of lanosterol with hydrogen.

*Agnosterol.*—It occurs in wool fat. It contains three double bonds which are in the 7:8, 9:11, and 24:25 positions in its molecule. The double bond in the 24:25 position is the most reactive of the three.

*Dihydroagnosterol.*—This sterol also occurs in wool fat. It contains two double bonds which are in the 7:8 and 9:11 positions in its molecule and is prepared from agnosterol by saturating the double bond in the side chain with hydrogen.

*Sitosterol.*—This is the principal plant sterol. It occurs in soya bean oil and other vegetable oils as well as in tall oil, a by-product of cellulose pulp manufacture by the sulphate process. It contains one double bond in the 5:6 position in its molecule.

*Stigmasterol.*—This is another phytosterol. It contains two double bonds which are in the 5:6 and 22:23 positions in its molecule. Sex hormones have been made from both stigmasterol and sitosterol.

*Ergosterol.*—It occurs in many fats and oils and also in human and animal skins. It is now obtained from yeast and forms vitamin D$_2$ when irradiated with ultra-violet light. It contains three double bonds which are in the 5:6, 7:8, and 22:23 positions in its molecule. The double bond in the 22:23 position is the most reactive one, followed by the one in the 7:8 position, while the one in the 5:6 position is the least reactive.

According to the invention, an unsaturated sterol having from one to three double bonds, and preferably one that is substantially pure, is reacted with sulfur in the presence of iodine in elemental form as a catalyst at a temperature ranging from about 210° C. to 235° C. to produce a modified sterol in which the sole modification consists of the saturation of at least one double bond in the molecule with sulfur to form a thiirane group of the formula

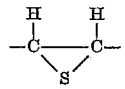

Since the unsaturated sterol may contain from one to three double bonds, the resulting modified sterol may contain from one to three thiirane groups (sulfurized double bonds) of the aforementioned formula.

In preparing a modified sterol containing only one of the aforesaid thiirane groups in its formula a sterol having from one to three double bonds, is reacted with the stoichiometrical amount of sulfur required to saturate only one double bond in the presence of iodine in elemental form as a catalyst at a temperature of about 210° C., said iodine catalyst being present in an amount equivalent to about 5% of the weight of the sulfur. The resulting modified sterol contains only one thiirane group in its molecule.

In preparing a modified sterol containing only two of the above described thiirane groups in its molecule, a sterol having from two to three double bonds, such as 7-dehydrocholesterol, lanosterol, dihydroagnosterol, stigmasterol, agnosterol, or ergosterol, is first reacted as described above to saturate one double bond, and the resulting modified sterol containing one thiirane group of the above formula is then reacted with the stoichiometrical amount of sulfur required to saturate a second double bond under the same conditions utilized to saturate the first double bond but at a temperature of about from 220° C. to 225° C. The resulting modified sterol contains only two thiirane groups in its molecule.

In preparing a modified sterol containing three thiirane groups in its molecule, a sterol having three double bonds, such as agnosterol or ergosterol, is sulfurized as described above to saturate two of the double bonds, and the resulting sterol containing the two thiirane groups is reacted with the stoichiometrical amount of sulfur required to saturate the remaining double bond under the same conditions required to saturate the first and second double bonds but at a temperature of about from 230° C. to 235° C. thereby to produce a modified sterol in which the sole modification consists of the saturation of the three double bonds in the molecule to form thiirane groups.

Selective sulfurization of unsaturated sterols containing more than one double bond is carried out in accordance with the following procedure: The sterol is heated in an enamel-ware container or other suitable container not attacked by sulfur at elevated temperature. Continuous agitation is maintained through the process. The sulfur to be added is first thoroughly mixed and ground with iodine used as a catalyst. Iodine in amounts equivalent to 5% of the weight of sulfur used is required. The sulfur-iodine mixture is allowed to stand for a while with occasional stirring to allow the iodine to be absorbed or combine with the sulfur, forming a reddish brown mixture. When the temperature of the molten sterol has reached approximately 180° C., the required amount of the sulfur-iodine mixture to saturate one double bond is slowly added. Heating is continued until a temperature of about 210° C. is reached where it is held until the sulfur has chemically combined, as shown by test. The usual test is to dissolve some of the material in a solvent in which the sterol is soluble but in which sulfur is insoluble. Solvents such as chloroform or carbon tetrachloride may be used. If the solution is clear and no signs of any sediment appear, the sulfur has chemically combined with the sterol. The sulfur always adds to the most reactive double bond first, when more than one double bond is present in the sterol.

The sulfurization of the second double bond in a sterol following the sulfurization of the most reactive double bond, as described above, is carried out as follows: After the sulfur has combined with the first double bond an additional amount of sulfur-iodine mixture is slowly added to the hot sterol in an amount required to saturate the second double bond. Heating is continued until a temperature of about from 220° C. to 225° C. is reached where it is maintained until the sulfur has chemically combined with the double bond as shown by the test previously described. The sulfur adds to the second most reactive double bond.

The sulfurization of the third double bond is carried out as follows: The first and second most reactive double bonds are first sulfurized as described above. Additional sulfur-iodine mixture is added in the required amount and heating is continued until a temperature of about from 230° C. to 235° C. has been reached where it is held until the sulfur has saturated the third double bond as shown by test. During the sulfurization process carbon dioxide or nitrogen may be used to blanket the surface of the hot sterol to prevent oxidation.

After sulfurization, agitation is maintained until the reaction product has cooled to about the point when crystallization starts, as all of the sulfurized sterols have relatively high melting points. The product is purified by grinding and washing in cold water, is dried and then recrystallized from a solvent.

The sulfurized sterols are solids at ordinary temperature and are of a light reddish brown in color. They are practically insoluble in water, most of them sparingly soluble in cold alcohol but soluble in boiling alcohol from which they crystallize on cooling. They are soluble in chloroform, carbon tetrachloride, vegetable oils, and other solvents.

The following examples are illustrative of the invention.

Example 1

One molecular weight of cholesterol (386 gms.) is reacted with one atomic weight (32 gms.) of sulfur using iodine in the manner previously described. A light reddish yellow product is obtained with an approximate melting point of 145° C. after purification. It is soluble in chloroform, carbon tetrachloride, vegetable and animal oils and other solvents.

Example 2

To produce a sulfurized lanosterol in which the sulfur is in the side chain, 426 grams (one mole) of lanosterol is reacted with 32 grams of sulfur, using iodine as catalyst, in the manner previously described for selective sulfurization. A light reddish yellow product is obtained which has a melting point of approximately 139° C. after purification.

Example 3

To produce a sulfurized dihydro-lanosterol, which contains one double bond, 428 grams (one mole) of the material is heated with 32 grams of sulfur in a manner previously described, using the required amount of iodine as catalyst. A light reddish yellow product is obtained which melts at 142° C. after purification.

Example 4

The sulfurization of agnosterol, which contains three double bonds may be carried out in three steps as follows:

(1) 422 grams (one mole) of agnosterol is heated with 32 grams of sulfur using iodine, as already described, until the double bond in the side chain has been saturated with sulfur. A product is obtained having a light reddish yellow color, melting at about 160° C. after purification.

(2) The product obtained from the first step is heated with an additional 32 grams of sulfur, using iodine as catalyst, until one of the other double bonds has reacted with the sulfur. The double bond nearest the side chain is more reactive than the one farther away. It is preferable to add the second amount of sulfur to the hot reaction product obtained in the first step. A product is obtained which is slightly more reddish yellow than the first, having a melting point of about 157° C. after purification.

(3) The product obtained from the second step, while hot, is heated to a higher temperature with an additional 32 grams of sulfur-iodine mixture until the sulfur had been chemically added to the least reactive bond, as previously described under selective sulfurization. A more reddish yellow product is obtained than in steps one and two, the product having a melting point of about 154° C. after purification.

Example 5

The sulfurization of dihydro-agnosterol is carried out similarly to that of agnosterol with the exception that instead of three stages of sulfurization there will be only two as the double bond in the side chain has been saturated with hydrogen. Light reddish yellow products are obtained having melting points, after purification, of 154° C. for the product containing one atom of sulfur, and 151° C. for the product containing two atoms of sulfur.

Example 6

The sulfurization of sitosterol which contains one double bond is carried out by heating 386 grams of the sterol with 32 grams of the sulfur-iodine mixture as previously described. The purified product has a light reddish yellow color and a melting point of 135° C. after recrystallization.

Example 7

The sulfurization of stigmasterol which contains one double bond is carried out by heating 412 grams of the material with 32 grams of the sulfur-iodine mixture in a manner already described. It has a light reddish yellow color after purification and has a melting point of 167° C.

Example 8

The sulfurization of ergosterol is carried out in a manner similar to that of agnosterol as it has three double bonds in its molecule. One mole (396 grams) of the sterol is progressively heated with the required sulfur-iodine mixture as described in Example 4, above. The sulfur adds to the double bond in the side chain first, giving a light reddish yellow product with melting point of about 159° C. after recrystallization. Sulfur next adds to the double bond in the 7–8 position, giving a slightly darker product melting at 156° C. Sulfur next adds to the double bond in the 5–6 position giving a product of a deeper reddish yellow color with a melting point of 152° C. after recrystallization.

All of the sulfurized sterols are solids. They are soluble in chloroform and in boiling anhydrous ethyl alcohol from which they crystallize from solution on chilling. The purification of the various sulfurized sterols consists of dissolving in suitable hot solvents and allowing them to crystallize in chilling.

The sulfur compounds may be designated as mono-, di-, and tri- depending upon whether one, two, or three double bonds of the sterol are saturated with sulfur. Or, when the location of the double bond is known, by the appropriate designation, such as 5-sulfur cholesterol which may be represented by the following formula:

$$\begin{array}{c} CH(CH_3)CH_2CH_2CH_2CH(CH_3)_2 \end{array}$$

I claim:

1. A substantially pure modified sterol in which the sole modification consists of the saturation of at least one double bond in the molecule with sulfur to form a thiirane group of the formula $$-\underset{|}{\overset{H}{C}}\underset{\diagdown S\diagup}{\underset{|}{\overset{H}{C}}}-$$

2. A substantially pure modified sterol selected from the group consisting of cholesterol, 7-dehydrocholesterol, lanosterol, dihydrolanosterol, agnosterol, dihydroagnosterol, sitosterol, stigmasterol, and ergosterol, and in which the sole modification consists of the saturation of at least one double bond in the molecule with sulfur to form a thiirane group of the formula $$-\underset{|}{\overset{H}{C}}\underset{\diagdown S\diagup}{\underset{|}{\overset{H}{C}}}-$$

3. Substantially pure modified cholesterol in which the sole modification consists of the saturation of the double bond in the molecule with sulfur to form a thiirane group of the formula $$-\underset{|}{\overset{H}{C}}\underset{\diagdown S\diagup}{\underset{|}{\overset{H}{C}}}-$$

4. Substantially pure modified lanosterol in which the sole modification consists of the saturation of at least one of the two double bonds in the molecule with sulfur to form a thiirane group of the formula

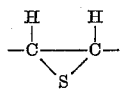

5. Substantially pure modified lanosterol in which the sole modification consists of the saturation of the double bond in the 24:25 position in the molecule with sulfur to form a thiirane group of the formula

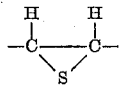

6. Substantially pure modified sitosterol in which the sole modification consists of the saturation of the double bond in the molecule with sulfur to form a thiirane group of the formula

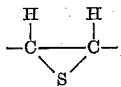

7. Substantially pure modified ergosterol in which the sole modification consists of the saturation of at least one of the three double bonds in the molecule with sulfur to form a thiirane group of the formula

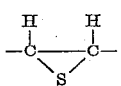

8. Substantially pure modified ergosterol in which the sole modification consists of the saturation of the double bond in the 22:23 position in the molecule with sulfur to form a thiirane group of the formula

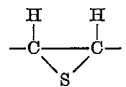

9. Substantially pure modified 7-dehydrocholesterol in which the sole modification consists of the saturation of at least one of the two double bonds in the molecule with sulfur to form a thiirane group of the formula

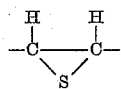

10. Substantially pure modified 7-dehydrocholesterol in which the sole modification consists of the saturation of the double bond in the 7:8 position in the molecule with sulfur to form a thiirane group of the formula

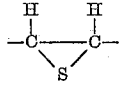

References Cited in the file of this patent

UNITED STATES PATENTS

| | | |
|---|---|---|
| 2,218,971 | Julian et al. | Oct. 22, 1940 |
| 2,260,953 | Rebold | Oct. 28, 1941 |
| 2,326,936 | Fiedler et al. | Aug. 17, 1943 |
| 2,375,874 | Rosenberg et al. | May 15, 1945 |
| 2,427,717 | Dearborn | Sept. 23, 1947 |

OTHER REFERENCES

Richter: The Chem. of Carbon Compounds (1939), vol. II, pp. 547–548.

Merck Index, 5th ed. (1940), p. 141.